United States Patent
Okamoto et al.

(10) Patent No.: US 11,594,341 B2
(45) Date of Patent: Feb. 28, 2023

(54) PIT GATE, PIT EQUIPMENT, NUCLEAR POWER FACILITY, AND PIT GATE INSTALLATION METHOD

(71) Applicant: MITSUBISHI HEAVY INDUSTRIES, LTD., Tokyo (JP)

(72) Inventors: Hiromu Okamoto, Tokyo (JP); Hisanori Watanabe, Tokyo (JP); Hidetaka Kafuku, Tokyo (JP); Shunsuke Tanaka, Tokyo (JP); Hiroki Mitsui, Tokyo (JP); Yasuharu Suda, Tokyo (JP); Takao Ito, Tokyo (JP); Hayao Kurono, Tokyo (JP); Shuhei Dobara, Tokyo (JP); Takumi Hori, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/633,369

(22) PCT Filed: Sep. 21, 2018

(86) PCT No.: PCT/JP2018/035084
§ 371 (c)(1),
(2) Date: Jan. 23, 2020

(87) PCT Pub. No.: WO2019/065506
PCT Pub. Date: Apr. 4, 2019

(65) Prior Publication Data
US 2021/0158979 A1    May 27, 2021

(30) Foreign Application Priority Data
Sep. 29, 2017   (JP) .............................. JP2017-190209

(51) Int. Cl.
*G21C 13/028*   (2006.01)
*G21C 19/07*   (2006.01)
*E02B 7/54*   (2006.01)

(52) U.S. Cl.
CPC ............ *G21C 13/028* (2013.01); *G21C 19/07* (2013.01); *E02B 7/54* (2013.01)

(58) Field of Classification Search
CPC . E02B 7/54; E02B 7/34; E06B 7/2318; G21C 13/028; G21C 19/07
See application file for complete search history.

(56) References Cited

U.S. PATENT DOCUMENTS

| 4,355,000 A | 10/1982 | Lumelleau |
| 4,375,104 A | 2/1983 | Starr et al. |
| 2016/0141055 A1* | 5/2016 | Tsuge ..................... G21C 19/07 405/87 |

FOREIGN PATENT DOCUMENTS

| CN | 206173907 U | * 5/2017 |
| CN | 206173907 U | 5/2017 |

(Continued)

OTHER PUBLICATIONS

International Search Report dated Dec. 18, 2018, issued in Application No. PCT/JP2018/035084, with English Translation. (4 pages).

(Continued)

*Primary Examiner* — Jack W Keith
*Assistant Examiner* — Joshua C Devorkin
(74) *Attorney, Agent, or Firm* — WHDA, LLP

(57) ABSTRACT

A pit gate includes a gate body which is inserted between a pool portion storing water and a canal portion connected to the pool portion and is configured to change a flow state of the water, and a seal portion (6) which is accommodated in a groove-shaped accommodation recess formed in the gate body and seals between the pool portion and the gate body. The seal portion (6) includes a low-rigidity portion (10)

(Continued)

which is relatively easily deformed by a load according to a water pressure from the pool portion side, and a high-rigidity portion (11) which is provided on the pool portion side of the low-rigidity portion and is not easily deformed relatively by the load.

5 Claims, 12 Drawing Sheets

(56) References Cited

FOREIGN PATENT DOCUMENTS

| JP | S55-116299 U | 8/1980 |
| JP | S56-043595 A | 4/1981 |
| JP | S57-128890 A | 8/1982 |
| JP | S58-097352 U | 7/1983 |
| JP | H04-127095 A | 4/1992 |
| JP | 3059403 U | 7/1999 |
| JP | 2001-164542 A | 6/2001 |
| JP | 2001164542 A * | 6/2001 |
| JP | 2001-234674 A | 8/2001 |
| JP | 2006-046489 A | 2/2006 |
| JP | 2006-299666 A | 11/2006 |
| JP | 2009-114665 A | 5/2009 |
| JP | 2016-099168 A | 5/2016 |
| KR | 10-1662494 B1 | 10/2016 |
| KR | 101662494 B1 * | 10/2016 |

OTHER PUBLICATIONS

Written Opinion dated Dec. 18, 2018, issued in Application No. PCT/JP2018/035084, with English Translation. (15 pages).

* cited by examiner (a)

(b)

(c)

PIT GATE, PIT EQUIPMENT, NUCLEAR POWER FACILITY, AND PIT GATE INSTALLATION METHOD

TECHNICAL FIELD

The present invention relates to a pit gate, pit equipment, a nuclear power facility, and a pit gate installation method.

Priority is claimed on Japanese Patent Application No. 2017-190209, filed on Sep. 29, 2017, the content of which is incorporated herein by reference.

BACKGROUND ART

For example, in a nuclear power facility such as a Pressurized Water Reactor (PWR), a container (cask) accommodating a spent nuclear fuel is stored in a pit. The pit has a pool filled with water. The cask is stored under the water in the pool. The pool is connected to a nuclear reactor and a carry-out chamber by a waterway referred to as a canal. The cask is sent or received between the nuclear reactor and the carry-out chamber, and the pool through the canal.

The pool needs to be constantly filled with water for the purpose of blocking radiation and cooling the spent nuclear fuel. Meanwhile, in other equipment connected to the pool by the canal, for example, the water may be temporarily discharged from the canal, due to a request for maintenance or the like. Accordingly, a pit gate is provided between the pool and the canal or in a middle of the canal. After the pit gate is closed, the water in the canal is discharged in a state where the water in the pool is maintained.

As a specific example of the pit gate, a pit gate described in Patent Document 1 below is known. The pit gate of Patent Document 1 includes a gate body which is inserted along a slot, and a seal portion which seals between the gate body and the slot. The seal portion is made of silicon rubber or the like and has a solid triangular cross section.

CITATION LIST

Patent Literature

[Patent Document 1] Japanese Unexamined Patent Application, First Publication No. 2016-99168

DISCLOSURE OF INVENTION

Technical Problem

Here, the seal portion abuts against a member called a metal liner attached to a wall surface of the pit. A plurality of irregularities may be formed on a surface of the liner. A frictional force acting between the irregularities and the seal portion may inhibit the insertion of the gate body. In particular, in the solid seal portion described in Patent Document 1, a comparatively large surface pressure is generated between the seal portion and the liner immediately after the insertion of the gate body starts. Accordingly, smooth opening and closing of the gate body are inhibited. Therefore, there is an increasing demand for a pit gate which can be opened and closed more smoothly.

The present invention provides a pit gate capable of being more smoothly inserted and having sufficient sealing performance, pit equipment, a nuclear power facility, and a pit gate installation method.

Solution to Problem

According to a first aspect of the present invention, there is provided a pit gate including: a gate body which is configured to be inserted between a pool portion storing water and a canal portion connected to the pool portion in pit equipment having the pool portion and the canal portion and is configured to change a flow state of the water; and a seal portion which is accommodated in a groove-shaped accommodation recess formed in the gate body and seals a gap between the gate body on the pool portion side and a wall surface of the pit equipment on the canal portion side, in which the seal portion includes a low-rigidity portion which is relatively easily deformed by a load according to a water pressure from the pool portion side and a high-rigidity portion which is provided on the pool portion side of the low-rigidity portion and is not easily deformed relatively by the load. A gate body which is inserted between a pool portion storing water and a canal portion connected to the pool portion and is configured to change a flow state of the water; and a seal portion which is accommodated in a groove-shaped accommodation recess formed in the gate body and seals between the pool portion and the gate body, in which the seal portion includes a low-rigidity portion which is relatively easily deformed by a load according to a water pressure from the pool portion side, and a high-rigidity portion which is provided in a position closer to the pool portion with respect to the low-rigidity portion and is relatively difficult to deform by the load.

According to this configuration, when the gate body is inserted, the low-rigidity portion which is relatively easily deformed is deformed. Accordingly, a friction force acting between a pool portion wall surface and the gate body is reduced. Therefore, the gate body can be inserted smoothly. Moreover, in this case, the deformation of the high-rigidity portion is slight. Meanwhile, if the water in the canal portion is drained and the water pressure from the pool portion side with respect to the gate body increases, the high-rigidity portion is pressed against the pool portion wall surface by the load according to the water pressure and is deformed. Accordingly, a surface pressure is generated between the high-rigidity portion and the pool portion wall surface. The seal portion can exert sufficient sealing performance by the surface pressure. In this way, according to the configuration, the gate body can be easily inserted, and the seal portion can exert sufficient sealing performance in a state where the water pressure is applied.

According to a second aspect of the present invention, in a state where the load is not applied, at least a portion of the high-rigidity portion may protrude from the accommodation recess toward the canal side.

According to this configuration, a portion of the high-rigidity portion protrudes from the accommodation recess in the state where the load is not applied. For this reason, sufficient surface pressure can be ensured between the high-rigidity portion and the pool portion wall surface even in an initial stage of the insertion of the gate body. Therefore, it is possible to reduce an amount of water leakage which is generated when the gate body is inserted.

According to a third aspect of the present invention, the low-rigidity portion may include a plate-shaped portion which extends along a surface of the accommodation recess closer to the pool portion, and a protrusion portion which protrudes from the plate-shaped portion toward the pool portion and is in contact with the surface of the accommodation recess closer to the pool portion.

According to this configuration, the plate-shaped portion is supported in the accommodation recess through the protruding portion. Therefore, in a case where the water pressure is applied to the seal portion, the plate-shaped portion is deformed so as to crush the protruding portion. That is, according to the configuration, the low-rigidity portion can be obtained more easily, and a deformation direction of the low-rigidity portion can be easily regulated.

According to a fourth aspect of the present invention, the low-rigidity portion may be integrally formed with the high-rigidity portion and an inside of the low-rigidity portion may be hollow.

According to this configuration, in a case where the water pressure is applied to the seal portion, the low-rigidity portion is deformed so as to crush the hollow portion. That is, according to the configuration, the low-rigidity portion can be obtained more easily, and the deformation direction of the low-rigidity portion can be easily regulated.

According to a fifth aspect of the present invention, there is provided pit equipment including: the pit gate according to any one of the aspects; and the pool portion.

According to this configuration, the pit equipment in which the gate body is smoothly inserted and sufficient sealing performance is exerted can be obtained.

According to a sixth aspect of the present invention, there is provided a nuclear power facility including the pit equipment according to the aspect.

According to this configuration, the nuclear power facility capable of being smoothly operated can be obtained.

According to a seventh aspect of the present invention, there is provided a pit gate including: a gate body which is configured to be inserted between a pool portion storing water and a canal portion connected to the pool portion in pit equipment having the pool portion and the canal portion and is configured to change a flow state of the water; and a seal portion which is accommodated in a groove-shaped accommodation recess formed in the gate body and seals a gap between the gate body on the pool portion side and a wall surface of the pit equipment on the canal portion side, in which the seal portion includes a base portion which extends along a surface of the accommodation recess closer to the pool portion, a skirt portion which extends in a direction away from a central portion in a width direction of the gate body as the skirt portion extends from the base portion toward the canal portion side, and a lip portion which is provided on a surface of the skirt portion close to the center portion in the width direction of the gate body and protrudes in a direction different from a direction in which the skirt portion extends to form a water pressure chamber between the base portion and the lip portion.

According to this configuration, in a case where the seal portion abuts against the pool portion wall surface when the gate body is inserted, the skirt portion is deformed so as to approach the base portion. At the same time, the lip portion provided in the skirt portion moves in a direction protruding from the accommodation recess and is pressed against the pool portion wall surface. Thereby, a possibility that an extreme friction force may be generated between the lip portion and the pool portion wall surface can be reduced. Therefore, the gate body can be inserted smoothly. Meanwhile, if the water in the canal portion is drained and the water pressure from the pool portion side with respect to the gate body increases, the water flows to the water pressure chamber, and the lip portion is further pressed against the pool portion wall surface. Accordingly, a sufficient surface pressure can be ensured between the lip portion and the pool portion wall surface. That is, the seal portion can exert sufficient sealing performance. In this way, according to the configuration, the gate body can be easily inserted, and the seal portion can exert sufficient sealing performance in a state where the water pressure is applied.

According to an eighth aspect of the present invention, the seal portion may further include a base portion-side stopper portion which is provided on a side of the base portion away from the center portion in the width direction of the gate body from the skirt portion and protrudes toward the skirt portion.

According to this configuration, the base portion-side stopper portion is provided in the base portion. Therefore, when the skirt portion is deformed toward the base portion, an excessive deformation is limited by the base portion-side stopper portion. Therefore, a force generated in a connection portion between the base portion and the skirt portion can be reduced, and a possibility of occurrence of cracks or the like can be reduced.

According to a ninth aspect of the present invention, the seal portion may include a skirt portion-side stopper portion which is provided in a portion of the skirt portion facing the base portion and protrudes toward the base portion.

According to this configuration, the skirt portion-side stopper portion is provided in the skirt portion. Therefore, when the skirt portion is deformed toward the base portion, an excessive deformation is limited by the skirt portion-side stopper portion. Therefore, the force generated in the connection portion between the base portion and the skirt portion can be reduced, and the possibility of occurrence of cracks or the like can be reduced.

According to a tenth aspect of the present invention, there is provided pit equipment including: the pit gate according to any one of the seventh to ninth aspects; and the pool portion.

According to this configuration, the pit equipment in which the gate body is smoothly inserted and sufficient sealing performance is exerted can be obtained.

According to an eleventh aspect of the present invention, there is provided a nuclear power facility including the pit equipment according to the tenth aspect.

According to this configuration, the nuclear power facility capable of being smoothly operated can be obtained.

According to a twelfth aspect of the present invention, there is provided a pit gate including: a gate body which is configured to be inserted between a pool portion storing water and a canal portion connected to the pool portion in pit equipment having the pool portion and the canal portion and is configured to change a flow state of the water; and a seal portion which is accommodated in a groove-shaped accommodation recess formed in the gate body and seals a gap between the gate body on the pool portion side and a wall surface of the pit equipment on the canal portion side, in which the seal portion includes a seal portion main body in which a hollow portion is formed therein and at least a portion of an outer surface abuts against a wall surface of the pool portion even when a pressure in the hollow portion is equal to or less than the atmospheric pressure, and a gas supply unit which is configured to supply into and discharge from the hollow portion.

According to this configuration, since a rigidity of the hollow portion is low when the gate body is inserted, even if there are some irregularities on the pool portion wall surface (liner), the hollow portion is crushed so that the gate can be easily inserted. In a case where the irregularities of the liner are large and the gate is not easily inserted even when the hollow portion is crushed, the pressure in the hollow portion is reduced by the gas supply unit. Accordingly, a protrusion height of the seal portion from the accommodation recess can be suppressed to be low. Therefore, a friction force generated between the seal portion and the pool portion wall surface can be further reduced. Therefore, the gate body can be inserted smoothly. Meanwhile, in a state where the water on the canal side is discharged and a high water pressure is applied from the pool portion side, the hollow portion is crushed by the water pressure, and thus, functions substantially as a solid seal. Until the water on the canal portion side is completely discharged, the water pressure applied from the pool portion side is not yet sufficient. In a case where the water leaks from the pool portion side to the canal portion side, the pressure in the hollow portion increases, and thus, the seal portion is expanded. As a result, the seal portion abuts against the pool portion wall surface with a sufficient surface pressure. Therefore, the seal portion can exert sufficient sealing performance even during drainage of the water on the canal portion. If the drain on the canal portion side progresses, the hollow portion is crushed by the water pressure from the pool portion side, and a sufficient surface pressure is generated to ensure the sealing performance, the gas supply to the hollow portion may be stopped. In this way, according to the configuration, the gate body can be easily inserted without being greatly affected by the irregularities of the pool portion wall surface, and sufficient sealing performance can be secured even during the drainage of the canal portion. In addition, in a state where the water pressure is applied from the pool portion side, the seal portion can exert sufficient sealing performance without injecting the gas into the hollow portion.

According to a thirteenth aspect of the present invention, the seal portion may include a convex portion which is provided on an inner surface on at least one side in the direction connecting the pool portion and the canal portion to each other in the hollow portion and protrudes toward the other side.

According to this configuration, the convex portion is provided in the hollow portion. Therefore, when the seal portion is deformed so as to be crushed, the convex portion abuts against the inner surface of the hollow portion facing the convex portion. As a result, excessive deformation of the seal portion (hollow portion) is limited. Therefore, a possibility that a local stress concentration is generated in the hollow portion can be reduced, and the occurrence of cracks or the like can be avoided.

According to a fourteenth aspect of the present invention, the gas supply unit may further include a safety valve which is provided on a branch channel branching off from a main channel connecting the seal portion main body and the gas supply unit to each other and is configured to release a pressure in the hollow portion in a case where the pressure is equal or more than a predetermined threshold value, and a three-way valve which connects the main channel and the branch channel to each other.

According to this configuration, a possibility that the pressure in the hollow portion excessively increases can be reduced. Therefore, damages of the seal portion can be avoided, and the pressure in the seal portion (in the hollow portion) can be appropriately maintained.

According to a fifteenth aspect of the present invention, there is provided pit equipment including: the pit gate according to any one of the twelfth to fourteenth aspects; and the pool portion.

According to this configuration, the pit equipment in which the gate body is smoothly inserted and sufficient sealing performance is exerted can be obtained.

According to a sixteenth aspect of the present invention, there is provided a nuclear power facility including the pit equipment according to the fifteenth aspect.

According to this configuration, the nuclear power facility capable of being smoothly operated can be obtained.

According to a seventeenth aspect of the present invention, there is provided an installation method of a pit gate including a gate body which is configured to be inserted between a pool portion storing water and a canal portion connected to the pool portion and is configured to change a flow state of the water, and a seal portion which is accommodated in a groove-shaped accommodation recess formed in the gate body, seals between the pool portion and the gate body, and includes a hollow portion formed inside the seal portion, the installation method including: a step of installing the gate body in a state where a pressure inside the hollow portion is smaller than the atmospheric pressure; a step of supplying a gas to the hollow portion; and a step of discharging the water on the canal portion side.

According to this method, the pressure in the hollow portion is reduced by the gas supply unit when the gate body is inserted. Thereby, the protrusion height of the seal portion from the accommodation recess can be suppressed to be low. Therefore, the friction force generated between the seal portion and the pool portion wall surface can be reduced. Therefore, the gate body can be inserted smoothly. Meanwhile, in a state where the water on the canal side is discharged and a high water pressure is applied from the pool portion side, the pressure in the hollow portion increases, and thus, the seal portion is expanded. As a result, the seal portion abuts against the pool portion wall surface with a sufficient surface pressure. Therefore, the seal portion can exert sufficient sealing performance. In this way, according to the configuration, the gate body can be easily inserted, and the seal portion can exert sufficient sealing performance in a state where the water pressure is applied.

According to an eighteenth aspect of the present invention, there is provided a pit gate including: a gate body which is configured to be inserted between a pool portion storing water and a canal portion connected to the pool portion in pit equipment having the pool portion and the canal portion and is configured to change a flow state of the water; and a seal portion which is accommodated in a groove-shaped accommodation recess formed in the gate body and seals a gap between the gate body on the pool portion side and a wall surface of the pit equipment on the canal portion side, in which the seal portion includes a seal portion main body, and a flap portion which is provided in the seal portion main body, is located on one side in a width direction of the gate body from the seal main body, and protrudes toward the canal portion from the seal main body.

According to this configuration, when the gate body is inserted, only the flap portion abuts against the pool portion wall surface. Therefore, a friction force between the seal portion and the pool portion wall surface can be reduced. As a result, the gate body can be smoothly inserted. Meanwhile, in a state where the water on the canal portion side is discharged and a high water pressure is applied from the pool portion side, the seal portion main body abuts against the pool portion wall surface, and thus, sufficient sealing performance can be obtained. Thus, according to the configuration, the gate body can be easily inserted, and the seal portion can exert sufficient sealing performance in a state where the water pressure is applied.

According to a nineteenth aspect of the present invention, the flap portion may be formed of a metal.

According to this configuration, the flap portion is formed of a metal. Therefore, the flap portion can have a certain degree of rigidity. Thereby, a possibility that the flap portion is inadvertently deformed can be reduced. In a case where the flap portion is inadvertently deformed, the flap portion does not come into appropriate contact with the pool portion wall surface. Accordingly, the minimum surface pressure required when the water on the canal portion side is discharged cannot be ensured. However, according to the configuration, the possibility can be reduced.

According to a twentieth aspect of the present invention, the flap portion may be provided separately from the seal portion main body and may be attached to the gate body.

According to this configuration, since the seal portion main body and the flap portion are provided separately from each other, the ease of manufacture of each member can be ensured.

According to a twenty-first aspect of the present invention, there is provided pit equipment including: the pit gate according to any one of the eighteenth to twentieth aspects; and the pool portion.

According to this configuration, the pit equipment in which the gate body is easily inserted and sufficient sealing performance is exerted can be obtained.

According to a twenty-second aspect of the present invention, there is provided a nuclear power facility including the pit equipment according to the twenty-first aspect.

According to this configuration, the nuclear power facility capable of being smoothly operated can be obtained.

Advantageous Effects of Invention

According to the present invention, it is possible to provide a pit gate capable of being more smoothly inserted and having sufficient sealing performance, pit equipment, and a nuclear power facility.

BEST MODE FOR CARRYING OUT THE INVENTION

First Embodiment

Figure 1:
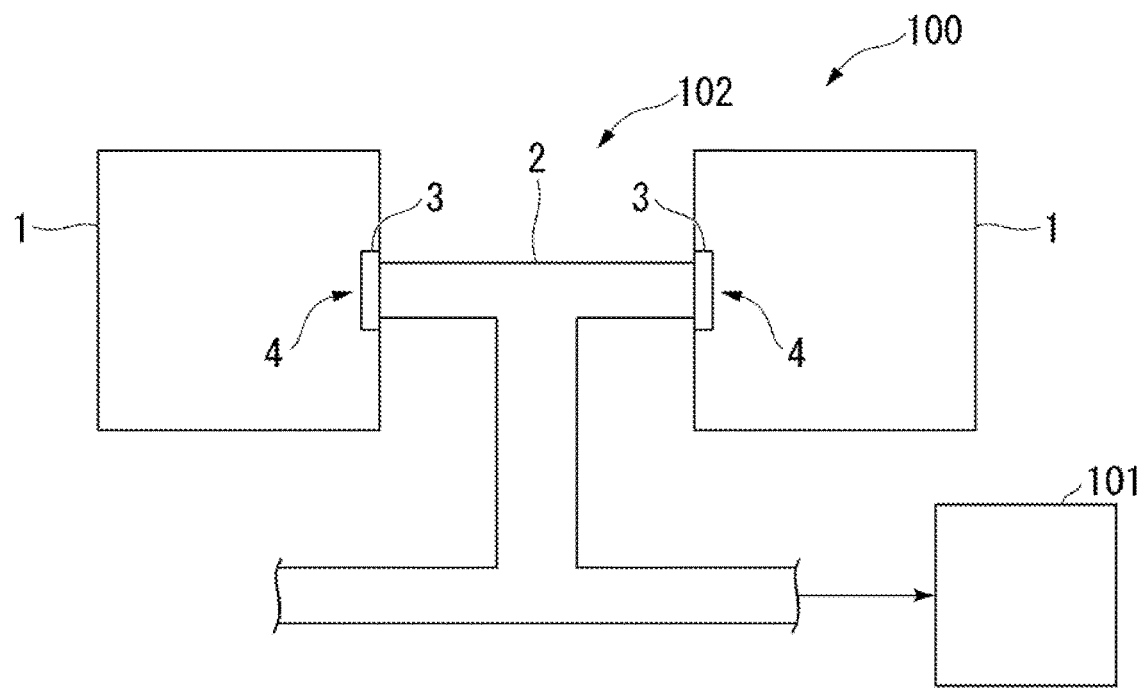
FIG. 1 is a schematic diagram showing a configuration of a nuclear power facility according to an embodiment of the present invention.

A first embodiment of the present invention will be described with reference to the drawings. As shown in FIG. 1, a nuclear power facility 100 according to the present embodiment includes a nuclear power facility main body 101 and pit equipment 102. Although not shown in detail, the nuclear power facility main body 101 has a nuclear reactor which generates high-temperature and high-pressure steam by heat generated by a fission reaction, power generation equipment which is driven by the steam to generate power, or the like.

In the nuclear reactor, nuclear fuel is used in the form of a fuel rod or a beret. Meanwhile, spent nuclear fuel is unloaded from the nuclear reactor in a state of being stored in a container referred to as a cask and transferred to the pit equipment 102.

The pit equipment 102 is provided to store and cool the spent nuclear fuel. Specifically, the pit equipment 102 includes a pool portion 1 which is filled with water, a canal portion 2 which connects the pool portion 1 and other equipment (the nuclear reactor or the like) to each other, and a pit gate 3 which is provided between the pool portion 1 and the canal portion 2.

A plurality of casks can be accommodated in the pool portion 1. The casks are stored in the water in the pool portion 1, and thus, release of radiation to the outside is avoided and the spent nuclear fuel is cooled. Although not shown in detail, a metal liner is attached to an inner wall surface of the pool portion 1. The liner includes a plurality of irregularities which are continuous in a height direction. The canal portion 2 is a waterway which connects the pool portion 1 and other equipment to each other. At normal times, similarly to the pool portion 1, the canal portion 2 is filled with the water.

As described above, the pool portion 1 needs to be constantly filled with the water. Meanwhile, in the other equipment connected to the pool portion 1 by the canal portion 2, for example, the water may be temporarily discharged from the canal portion 2 due to a request for maintenance of machine equipment disposed in the pool portion 1. For this reason, the pit gate 3 is provided in a connection portion (opening portion 4) between the pool portion 1 and the canal portion 2. By opening or closing the pit gate 3, a flow state of the water between the pool portion 1 and the canal portion 2 is changed.

Figure 2:
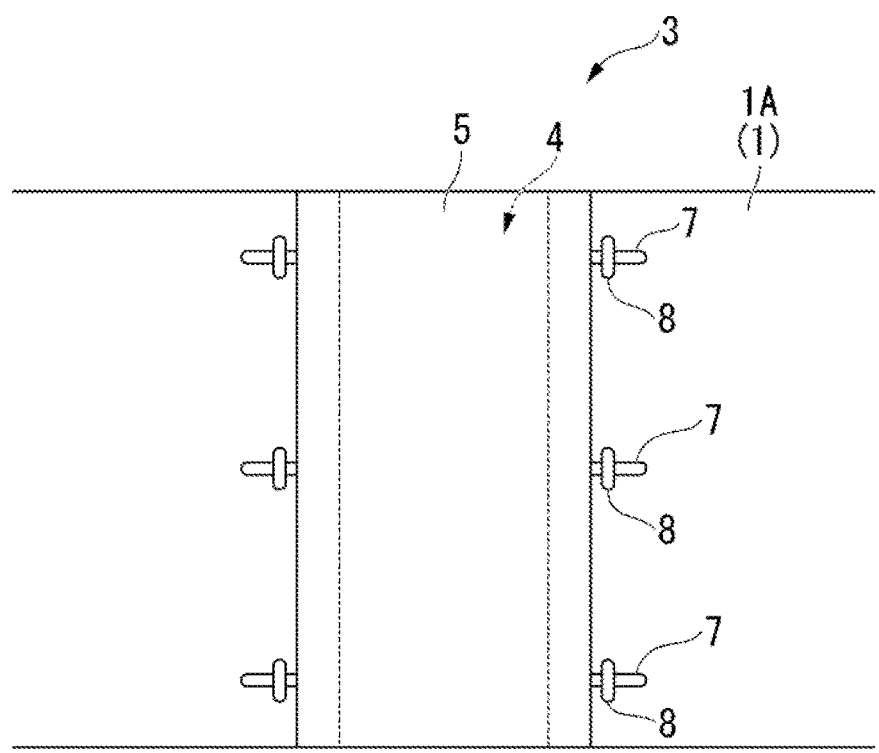
FIG. 2 is a front view showing a configuration of a pit gate according to an embodiment of the present invention.
Figure 3:
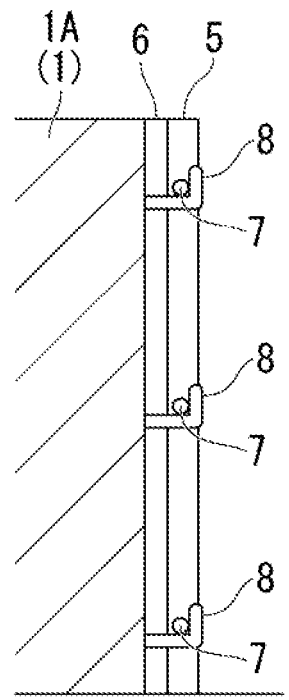
FIG. 3 is a side view showing the configuration of the pit gate according to the embodiment of the present invention.
Figure 4:
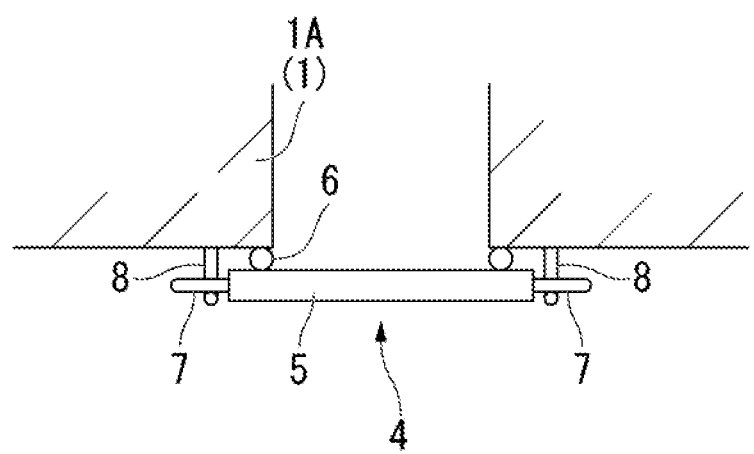
FIG. 4 is a plan view showing the configuration of the pit gate according to the embodiment of the present invention.

Specifically, as shown in FIGS. 2 to 4, the pit gate 3 has a gate body 5 and a seal portion 6 (refer to FIG. 4). The gate body 5 has a plate shape extending in an up-down direction. A plurality of engagement rods 7 are provided on each of end surfaces on both sides in a width direction of the gate body 5 at intervals in a height direction. The engagement rods 7 are provided on an inner wall surface (pool portion wall surface 1A) of the pool portion 1 and engage with a plurality of hooks 8 provided in a connection portion (opening portion 4) between the canal portion 2 and the inner wall surface. That is, the gate body 5 is installed inside the pool portion 1, abuts against the pool portion wall surface 1A, and thus, and maintains water tightness in the pool portion 1.

Figure 5:
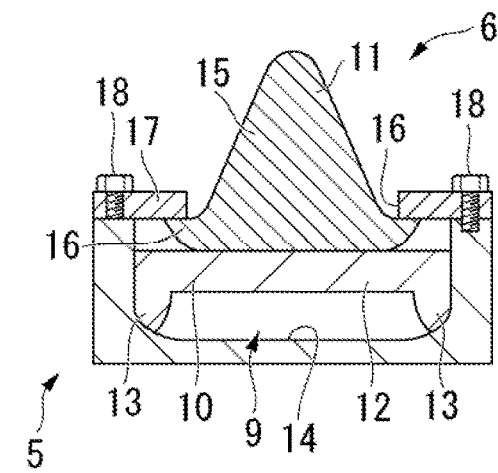
FIG. 5 is a cross-sectional view showing a configuration of a seal portion according to a first embodiment of the present invention, (a) shows a state before deformation, (b) shows a state during the deformation, and (c) shows a state after the deformation.
Figure 5:
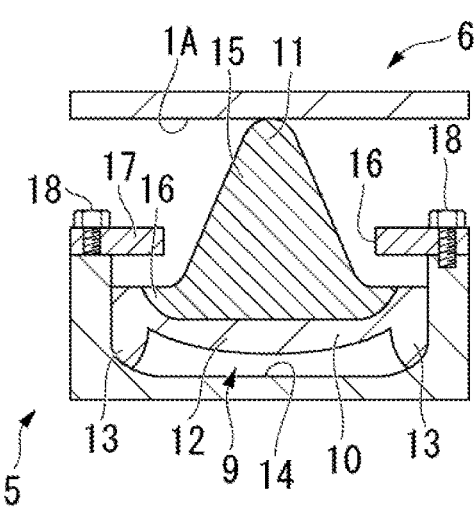
Figure 5:
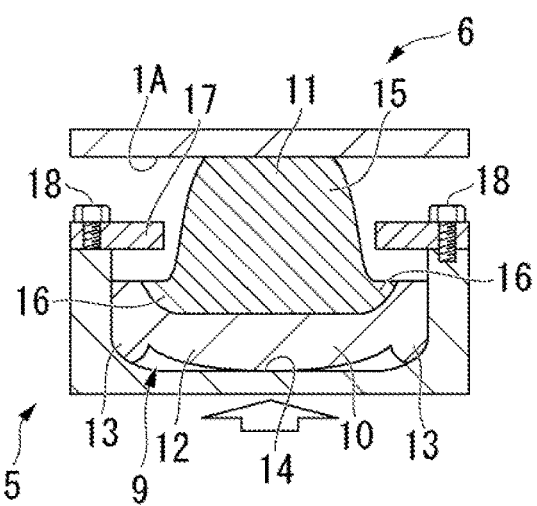

As shown in FIG. 5, groove-shaped accommodation recesses 9 in which the seal portions 6 are accommodated are provided on a surface of the gate body 5 facing the pool portion 1 side, and are formed on a lower portion and both side portions of the surface, except for an upper end portion thereof. The seal portion 6 is provided to seal between the gate body 5 and the pool portion wall surface 1A. Moreover, the pool portion wall surface 1A with which the seal portion 6 contacts is a liner surface. The seal portion 6 may seal between the gate body 5 and a wall surface other than the pool portion wall surface 1A. That is, the seal portion 6 only needs to seal a gap between the gate body 5 on the pool portion 1 side and a wall surface of the pit equipment 102 on the canal portion 2 side.

As shown in FIG. 5(a), the seal portion 6 according to the present embodiment has a low-rigidity portion 10 and a high-rigidity portion 11. The low-rigidity portion 10 and the high-rigidity portion 11 are adjacent to each other in a direction from the pool portion side to the canal portion side.

The low-rigidity portion 10 is formed of a material which is relatively easily deformed as compared with the high-rigidity portion 11. The high-rigidity portion 11 is formed of a material which is relatively difficult to be deformed as compared with the low-rigidity portion 10. That is, the high-rigidity portion 11 has a rigidity higher than that of the low-rigidity portion 10. As a material constituting the low-rigidity portion 10 and the high-rigidity portion 11, an appropriate material is selected from resin materials mainly composed of ethylene, propylene, diene rubber (EPDM), silicon rubber, or the like. In order to change the rigidity of each portion, an amount of an additive added to a main agent may be adjusted.

The low-rigidity portion 10 has a plate-shaped portion 12 and a protruding portion 13. The plate-shaped portion 12 has a plate shape extending along a surface (bottom surface 14) of the accommodation recess 9 on the pool portion 1 side. A pair of the protruding portions 13 is provided on the surface of the plate-shaped portion 12 facing the pool portion 1 side with a space therebetween. A distal end of the protruding portion 13 abuts against the bottom surface 14 of the accommodation recess 9.

The high-rigidity portion 11 abuts against a surface of the plate-shaped portion 12 facing the canal portion 2 side. The high-rigidity portion 11 has a substantially triangular cross section in plan view. Specifically, the high-rigidity portion 11 has a high-rigidity portion main body 15 of which a distal end protrudes from the accommodation recess, and a pair of edge portions 16 which is provided on the pool portion 1 side of the high-rigidity portion main body 15. The high-rigidity portion 11 protrudes from the accommodation recess 9 in a state where a load by a water pressure described later is not applied to the high-rigidity portion 11.

The edge portion 16 has a collar shape extending substantially parallel to the bottom surface 14. The edge portions 16 abut against the fixing lid 17 covering the accommodation recess 9, and thus, the entire seal portion 6 is fixed into the accommodation recess 9. The fixing lid 17 is fixed to the gate body 5 by bolts 18. In addition, in a case where silicon rubber is used as a main agent of the seal portion 6, the seal portion 6 can be fixed to the accommodation recess 9 by an adhesive. In this case, it is not necessary to use the fixing lid 17 and the bolt 18 described above.

Next, an operation of the pit gate 3 according to the present embodiment will be described with reference to FIGS. 5(a) to 5(c). When the pit gate 3 is closed, the gate body 5 is moved downward from above until the engagement rods 7 engage with the hooks 8. This operation may be referred to as "inserting the gate body 5". In this state, both the pool portion 1 and the canal portion 2 are filled with water. Therefore, the water pressure from the pool portion 1 side and the water pressure from the canal portion 2 side with respect to the gate body 5 counteract each other.

In this case, the seal portion 6 is in a state as shown in FIG. 5(b). That is, only the low-rigidity portion 10 is largely deformed, and the deformation of the high-rigidity portion 11 is slight. Specifically, in the low-rigidity portion 10, the plate-shaped portion 12 supported on the bottom surface 14 by the protruding portions 13 is elastically deformed based on the water pressure until the plate-shaped portion 12 abuts against the bottom surface 14. In other words, since the low-rigidity portion 10 is easily deformed, a friction force generated between the high-rigidity portion 11 and the pool portion wall surface 1A, which is a liner surface, is suppressed to be small.

Thereafter, the water in the canal portion 2 is discharged. Thereby, the water pressure only from the pool portion 1 side is added to the gate body 5. In this case, as shown in FIG. 5(c), in the seal portion 6, the high-rigidity portion 11 is also elastically deformed. Specifically, the high-rigidity portion 11 is elastically deformed so as to be crushed from the canal portion 2 side toward the pool portion 1 side. Thereby, a surface pressure is generated between the gate body 5 and the pool portion wall surface 1A, and thus, sealing performance therebetween is ensured.

As described above, according to the configuration, when the gate body 5 is inserted, the low-rigidity portion 10 which is relatively easily deformed is deformed. Accordingly, the friction force acting between the pool portion wall surface 1A and the gate body 5 is reduced. Therefore, the gate body 5 can be inserted smoothly. Moreover, in this case, the deformation of the high-rigidity portion 11 is slight. Meanwhile, if the water in the canal portion 2 is drained and the water pressure from the pool portion 1 side with respect to the gate body 5 increases, the high-rigidity portion 11 is pressed against the pool portion wall surface 1A by a load based on the water pressure and is deformed. Accordingly, the surface pressure is generated between the high-rigidity portion 11 and the pool portion wall surface 1A. The seal portion 6 can exert sufficient sealing performance by the surface pressure. In this way, according to the configuration, the gate body 5 can be easily inserted, and the seal portion 6 can exert sufficient sealing performance in a state where the water pressure is applied.

Further, according to the configuration, a portion of the high-rigidity portion 11 protrudes from the accommodation recess 9 in a state where the load based on the water pressure is not applied. For this reason, sufficient surface pressure can be ensured between the high-rigidity portion 11 and the pool portion wall surface 1A even in an initial stage of the insertion of the gate body 5. Therefore, it is possible to reduce an amount of water leakage which is generated when the gate body 5 is inserted.

In addition, according to the configuration, the plate-shaped portion 12 is supported in the accommodation recess 9 through the protruding portions 13. Therefore, in a case where the water pressure is applied to the seal portion 6, the plate-shaped portion 12 is deformed so as to crush the protruding portion 13. That is, according to the configuration, the low-rigidity portion 10 can be obtained more easily, and a deformation direction of the low-rigidity portion 10 can be easily regulated.

The first embodiment of the present invention is described with reference to the drawings. Moreover, various changes and modifications can be made to the configuration within a scope which does not depart from the gist of the present invention. For example, in the embodiment, the example in which the high-rigidity portion 11 has a triangular cross-sectional shape is described. However, the high-rigidity portion 11 can have other cross-sectional shapes such as a rectangular shape or a circular shape.

Second Embodiment

Figure 6:
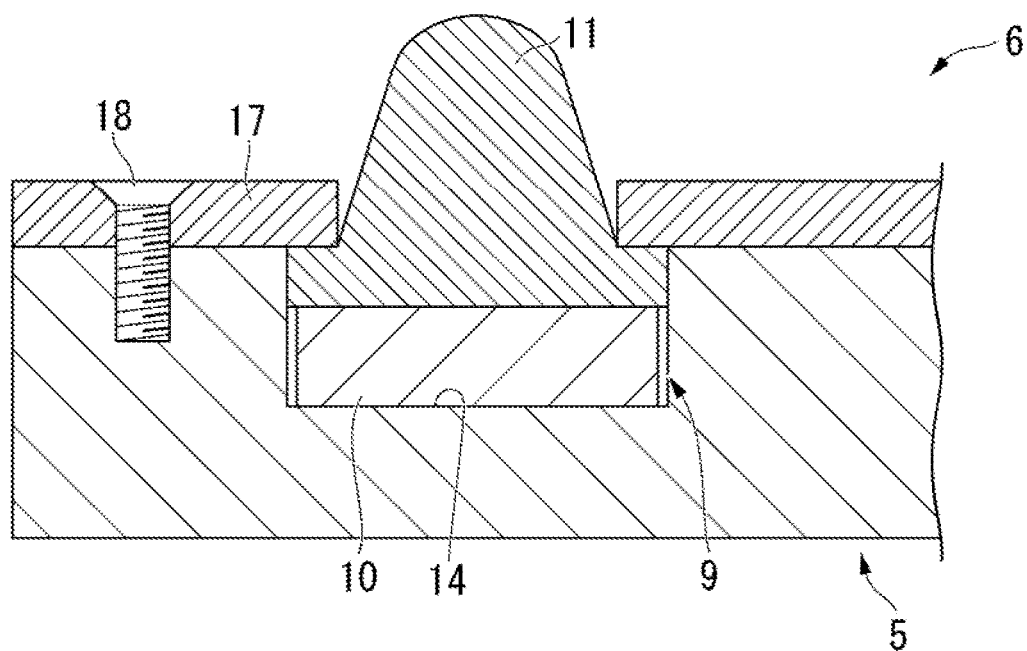
FIG. 6 is a cross-sectional view showing a configuration of a seal portion according to a second embodiment of the present invention.

Next, a second embodiment of the present invention will be described with reference to FIG. 6. Moreover, the same reference signs are assigned to the same configurations as those of the embodiment, and detailed descriptions thereof are omitted. As shown in FIG. 6, in the present embodiment, the low-rigidity portion 10 has a rectangular shape in a horizontal sectional view. Further, a slight gap is formed between a side surface of the low-rigidity portion 10 and a side surface of the accommodation recess 9. The low-rigidity portion 10 is elastically deformed so as to expand toward the side by this gap and to be crushed from the canal portion 2 side toward the pool portion 1 side.

According to the configuration, when the gate body 5 is inserted, the low-rigidity portion 10 which is relatively easily deformed is deformed. Accordingly, the friction force acting between the pool portion wall surface 1A and the gate body 5 is reduced. Therefore, the gate body 5 can be inserted smoothly. Moreover, in this case, the deformation of the high-rigidity portion 11 is slight. Meanwhile, if the water in the canal portion 2 is drained and the water pressure from the pool portion 1 side with respect to the gate body 5 increases, the high-rigidity portion 11 is pressed against the pool portion wall surface 1A by the load based on the water pressure to be deformed. Accordingly, the surface pressure is generated between the high-rigidity portion 11 and the pool portion wall surface 1A. The seal portion 6 can exert sufficient sealing performance by the surface pressure. In this way, according to the above configuration, the gate body 5 can be easily inserted, and the seal portion 6 can exert sufficient sealing performance in a state where the water pressure is applied. In addition, a deformation amount of the low-rigidity portion 10 can be defined in advance according to the size of the above-described gap.

The second embodiment of the present invention is described with reference to the drawings. Moreover, various changes and modifications can be made to the configuration within a scope which does not depart from the gist of the present invention.

Third Embodiment

Figure 7:
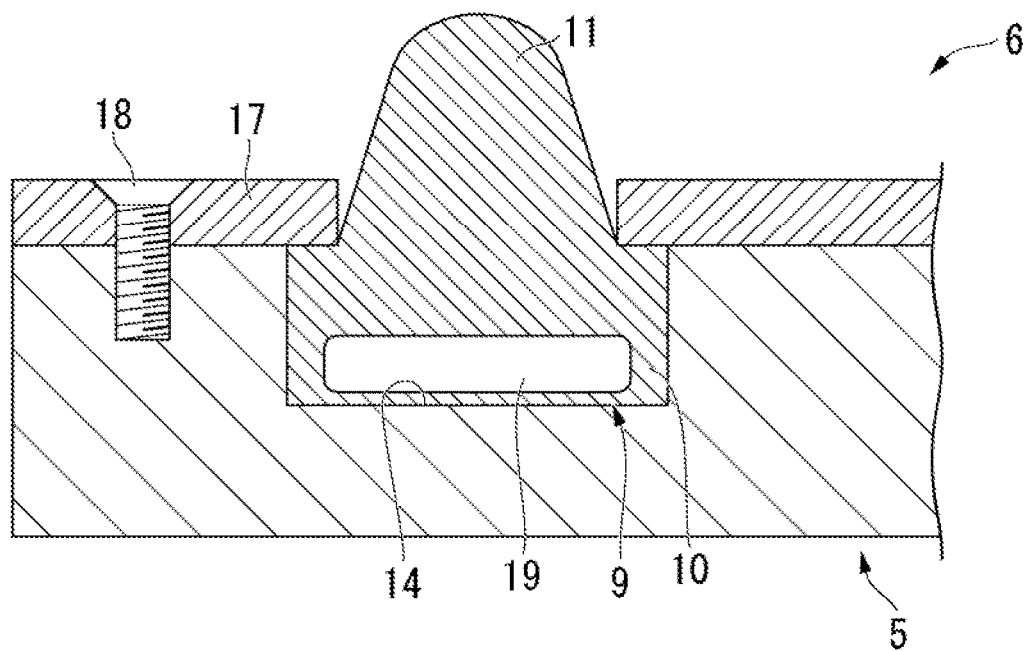
FIG. 7 is a cross-sectional view showing a configuration of a seal portion according to a third embodiment of the present invention.

Subsequently, a third embodiment of the present invention will be described with reference to FIG. 7. Moreover, the same reference signs are assigned to the same configurations as those of the respective embodiments, and detailed descriptions thereof are omitted. As shown in FIG. 7, in the present embodiment, the low-rigidity portion 10 is integrally formed of the same material as the high-rigidity portion 11 and an inside of the low-rigidity portion 10 is hollow. That is, a hollow portion 19 is formed inside the low-rigidity portion 10.

The hollow portion 19 is formed, the low-rigidity portion 10 is relatively easily deformed as compared with the high-rigidity portion 11. Therefore, when the gate body 5 is inserted, the low-rigidity portion 10 is relatively largely deformed. Accordingly, a friction force acting between the pool portion wall surface 1A and the high-rigidity portion 11 is reduced. Therefore, the gate body 5 can be inserted smoothly. Moreover, in this case, the deformation of the high-rigidity portion 11 is slight. Meanwhile, if the water in the canal portion 2 is drained and the water pressure from the pool portion 1 side with respect to the gate body 5 increases, the high-rigidity portion 11 is pressed against the pool portion wall surface 1A by a load based on the water pressure to be deformed. Accordingly, the surface pressure is generated between the high-rigidity portion 11 and the pool portion wall surface 1A. The seal portion 6 can exert sufficient sealing performance by the surface pressure. In this way, according to the above configuration, the gate body 5 can be easily inserted, and the seal portion 6 can exert sufficient sealing performance in the state where the water pressure is applied.

The third embodiment of the present invention is described with reference to the drawings. Moreover, various changes and modifications can be made to the configuration within a scope which does not depart from the gist of the present invention.

Fourth Embodiment

Figure 8:
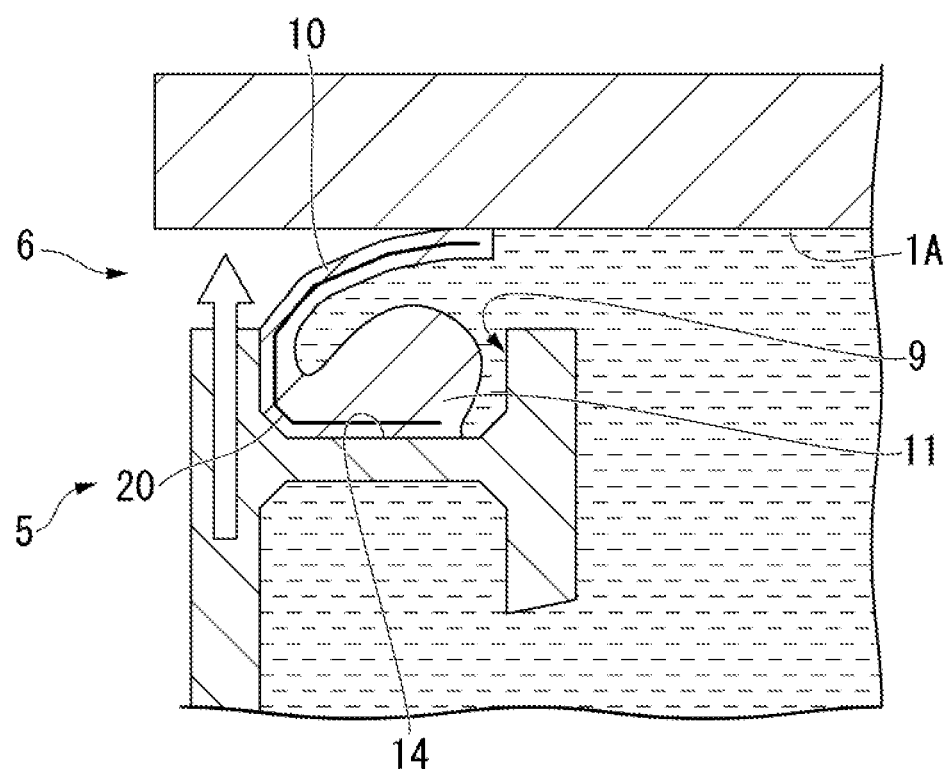
FIG. 8 is a cross-sectional view showing a configuration of a seal portion according to a fourth embodiment of the present invention.

Next, a fourth embodiment of the present invention will be described with reference to FIG. 8. Moreover, the same reference signs are assigned to the same configurations as those of the respective embodiments, and detail descriptions thereof are omitted. As shown in FIG. 8, in the present embodiment, the high-rigidity portion 11 and the low-rigidity portion 10 are integrally formed with each other. Specifically, the high-rigidity portion 11 has a horizontal cross-sectional shape corresponding to a shape of the accommodation recess 9. The low-rigidity portion 10 has a plate shape which extends from a side surface of the high-rigidity portion 11 so as to surround the high-rigidity portion 11 from the canal portion 2 side. A cross-sectional area of the low-rigidity portion 10 is set to be smaller than a cross-sectional area of the high-rigidity portion 11. A distal end portion of the low-rigidity portion 10 protrudes from the accommodation recess 9 to face the pool portion wall surface 1A. A metal leaf spring 20 is provided inside the low-rigidity portion 10.

When the gate body 5 is inserted, a minimum surface pressure with respect to the pool portion wall surface 1A is obtained by the low-rigidity portion 10 including the leaf spring 20 therein. Meanwhile, if the water in the canal portion 2 is drained and the water pressure from the pool portion 1 side with respect to the gate body 5 increases, the high-rigidity portion 11 is pressed against the pool portion wall surface 1A by the load based on the water pressure to be deformed. Accordingly, the surface pressure is generated between the high-rigidity portion 11 and the pool portion wall surface 1A. The seal portion 6 can exert sufficient sealing performance by the surface pressure. In this way, according to the above configuration, the gate body 5 can be easily inserted, and the seal portion 6 can exert sufficient sealing performance in a state where the water pressure is applied.

The fourth embodiment of the present invention is described with reference to the drawings. Moreover, various changes and modifications can be made to the configuration within a scope which does not depart from the gist of the present invention.

Fifth Embodiment

Figure 9:
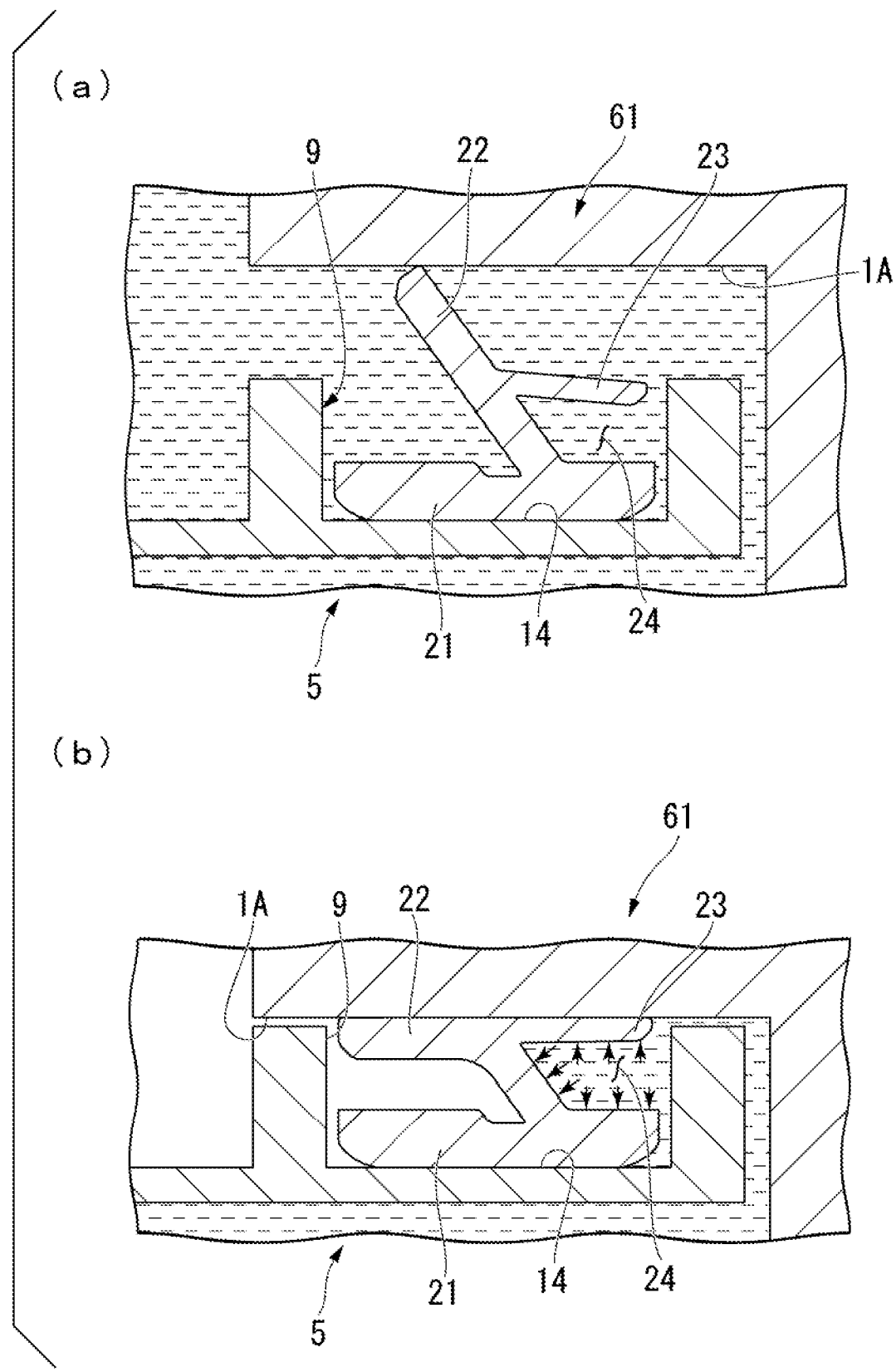
FIG. 9 is a cross-sectional view showing a configuration of a seal portion according to a fifth embodiment of the present invention, (a) shows a state before deformation, and (b) shows a state after the deformation.

Subsequently, a fifth embodiment of the present invention will be described with reference to FIGS. 9(a) and 9(b). Moreover, the same reference signs are assigned to the same configurations as those of the respective embodiments, and detail descriptions thereof are omitted. As shown in FIG. 9(a), in the present embodiment, a seal portion 61 is integrally formed in the shape of a lip seal. Specifically, the seal portion 61 includes a base portion 21, a skirt portion 22, and a lip portion 23.

The base portion 21 has a plate shape extending along the bottom surface 14 of the accommodation recess 9. The skirt portion 22 extends obliquely from the base portion 21 toward the canal portion 2 side. More specifically, the skirt portion 22 extends in a direction away from a central portion in a width direction of the gate body 5 as the skirt portion 22 extends from the base portion 21 toward the canal portion 2 side. The lip 23 portion is provided on a surface of the skirt portion 22 on a side close to the center portion in the width direction of the gate body 5. The lip portion 23 protrudes in a direction different from the skirt portion 22. A space serving as a water pressure chamber 24 is formed between the lip portion 23 and the base portion 21, and the side surface of the accommodation recess 9.

In this configuration, in a case where the seal portion 61 abuts against the pool portion wall surface 1A when the gate body 5 is inserted, the skirt portion 22 is deformed so as to approach the base portion 21. At the same time, the lip portion 23 provided in the skirt portion 22 moves in a direction protruding from the accommodation recess 9 and is pressed against the pool portion wall surface 1A. Thereby, a possibility that a large friction force may be generated between the lip portion 23 and the pool portion wall surface 1A can be reduced. Therefore, the gate body 5 can be inserted smoothly. Meanwhile, as shown in FIG. 9(b), if the water in the canal portion 2 is drained and the water pressure from the pool portion 1 side with respect to the gate body 5 increases, the water flows to the water pressure chamber 24, and the lip portion 23 is further pressed against the pool portion wall surface 1A. Accordingly, a sufficient surface pressure can be ensured between the lip portion 23 and the pool portion wall surface 1A. That is, the seal portion 61 can exert sufficient sealing performance. In this way, according to the configuration, the gate body 5 can be easily inserted, and the seal portion 61 can exert sufficient sealing performance in a state where the water pressure is applied.

The fifth embodiment of the present invention is described with reference to the drawings. Moreover, various changes and modifications can be made to the configuration within a scope which does not depart from the gist of the present invention.

Sixth Embodiment

Figure 10:
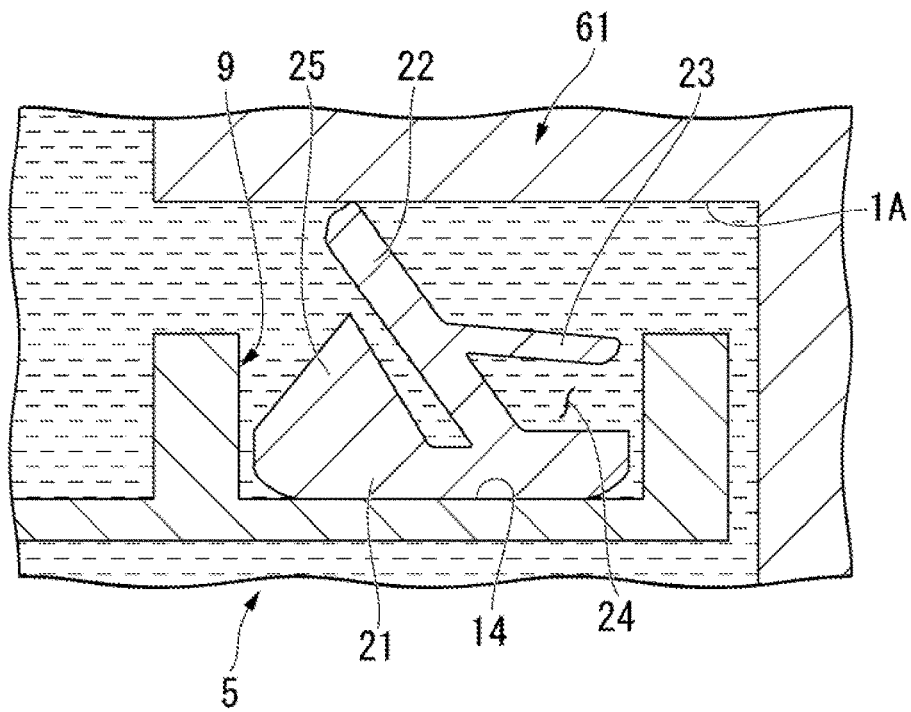
FIG. 10 is a cross-sectional view showing a configuration of a seal portion according to a sixth embodiment of the present invention.

Next, a sixth embodiment of the present invention will be described with reference to FIG. 10. Moreover, the same reference signs are assigned to the same configurations as those of the respective embodiments, and detail descriptions thereof are omitted. As shown in FIG. 10, in the present embodiment, a base portion-side stopper portion 25 is provided in the base portion 21 of the seal portion 61. The base portion-side stopper portion 25 is provided at a position of the base portion 21 away from the center portion in the width direction of the gate body 5 from the skirt portion 22. The base portion-side stopper portion 25 protrudes from the base portion 21 toward the skirt portion 22.

According to the configuration, the base portion-side stopper portion 25 is provided in the base portion 21. Thereby, when the skirt portion 22 is deformed toward the base portion 21, the base portion-side stopper portion 25 abuts against the skirt portion 22, and thus, an excessive deformation of the seal portion 61 is limited. Therefore, a local stress concentration generated in a connection portion between the base portion 21 and the skirt portion 22 can be reduced, and a possibility of occurrence of cracks or the like can be reduced.

Figure 11:
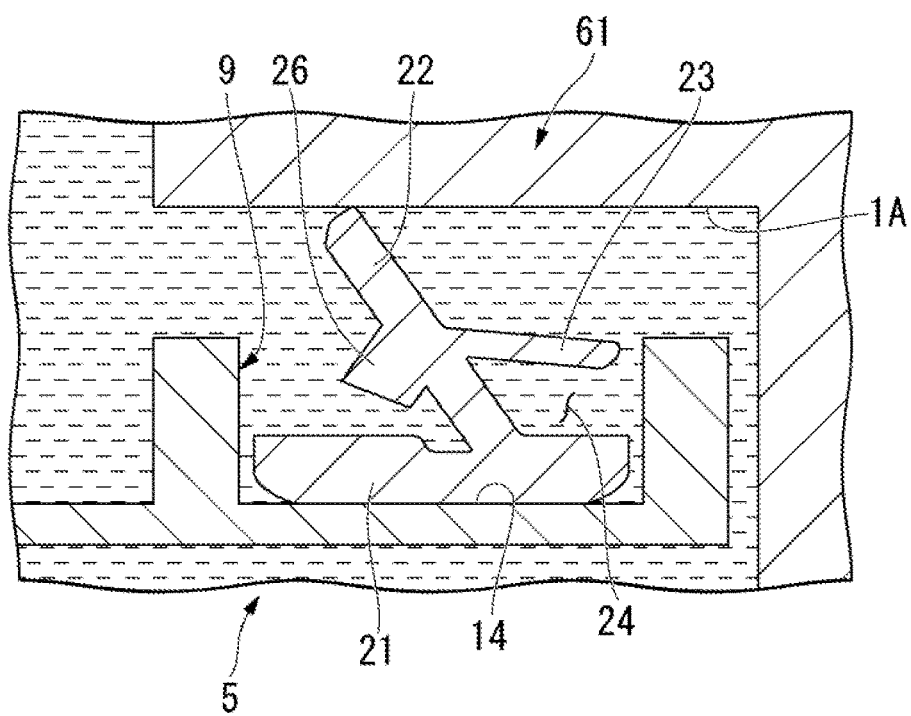
FIG. 11 is a cross-sectional view showing a modification example of the seal portion according to the sixth embodiment of the present invention.

The sixth embodiment of the present invention is described with reference to the drawings. Moreover, various changes and modifications can be made to the configuration within a scope which does not depart from the gist of the present invention. For example, as shown in FIG. 11, a skirt portion-side stopper portion 26 may be provided on the skirt portion 22 side instead of the above-described base portion-side stopper portion 25. The skirt portion-side stopper portion 26 is provided in a portion of the skirt portion 22 which faces the base portion 21. The skirt portion-side stopper portion 26 protrudes toward the base portion 21.

According to the configuration, the skirt portion-side stopper portion 26 is provided in the skirt portion 22. Thereby, when the skirt portion 22 is deformed toward the base portion 21, the skirt portion-side stopper portion 26 abuts against the base portion 21, and thus, an excessive deformation of the seal portion 61 is limited. Therefore, the local stress concentration generated in the connection portion between the base portion 21 and the skirt portion 22 can be reduced, and a possibility of occurrence of cracks or the like can be reduced.

In addition, it is also possible to adopt a structure which includes both the base portion-side stopper portion 25 and the skirt portion-side stopper portion 26.

Seventh Embodiment

Subsequently, a seventh embodiment of the present invention will be described with reference to FIGS. 12(a) to 12(d) and 13. Moreover, the same reference signs are assigned to the same configurations as those of the respective embodiments, and detail descriptions thereof are omitted. As shown in FIG. 12(a), in the present embodiment, a seal portion 62 includes a seal portion main body 27 and a gas supply unit 28.

The seal portion main body 27 is accommodated in an accommodation recess 9 and a hollow portion 29 is formed inside the seal portion main body 27. Further, a portion of the seal portion main body 27 which faces the canal portion 2 side is thicker than the other portions. The gas supply unit 28 can supply a gas (for example, air) into the hollow portion 29 or discharge the gas in the hollow portion 29. Thereby, a pressure in the hollow portion 29 can be reduced to the atmospheric pressure or lower, or increased to the atmospheric pressure or higher. An outer shape of the seal portion main body 27 is changed according to the pressure adjustment. Specifically, the gas supply unit 28 includes a gas pressure regulator 30 which stores or discharges a compressed gas, and a valve 32 which is provided on a main flow 31 connecting the gas pressure regulator 30 and the hollow portion 29 to each other. By adjusting an opening degree of the valve 32, the compressed gas in the gas pressure regulator 30 is supplied to the hollow portion 29 or discharged from the hollow portion 29.

When a pressure in the hollow portion 29 is the atmospheric pressure, a distal end portion (end portion on the canal portion 2 side) of the seal portion main body 27 slightly protrudes outward from the accommodation recess 9 and abuts against the pool portion wall surface 1A. In addition, even if the pressure in the hollow portion 29 is set to be equal to or lower than the atmospheric pressure, at least a portion (distal end portion) of the outer surface of the seal portion main body 27 slightly protrudes outward from the accommodation recess 9 and abuts against the pool portion wall surface 1A.

Figure 12:
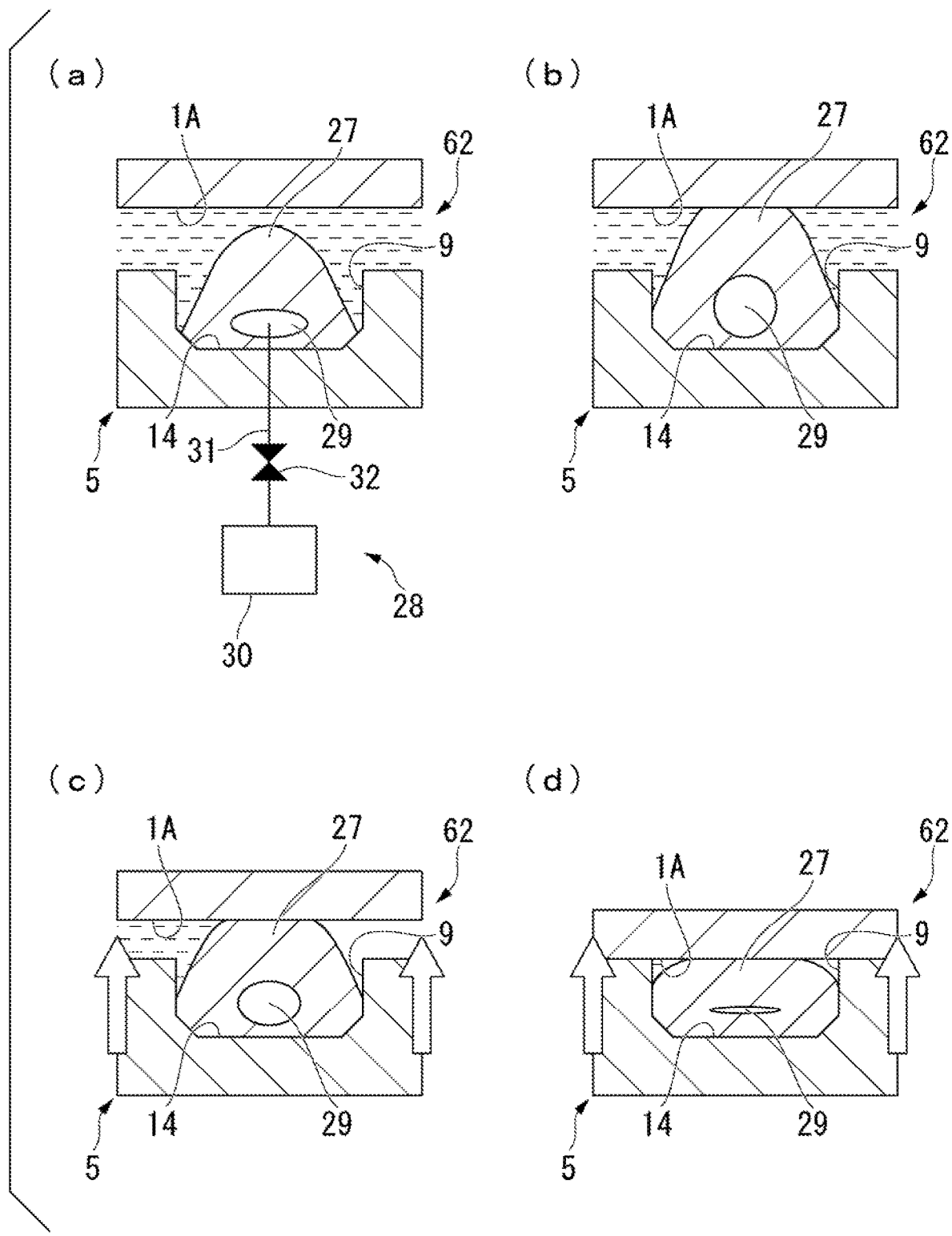
FIG. 12 is a cross-sectional view showing a configuration of a seal portion according to a seventh embodiment of the present invention, (a) shows a state before deformation, (b) and (c) show a state during the deformation, and (d) shows a state after the deformation.
Figure 13:
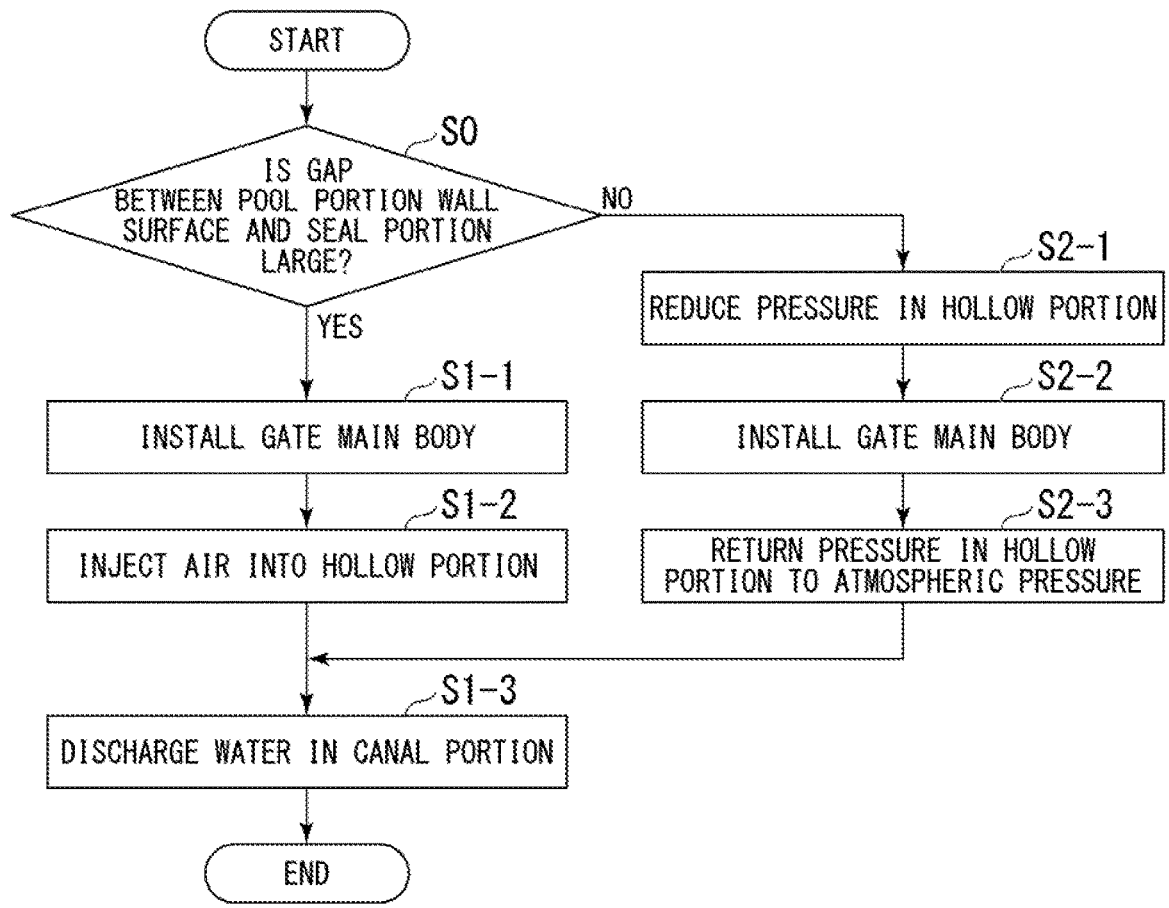
FIG. 13 is a process diagram showing each process of a pit gate installation method according to the seventh embodiment of the present invention.

Next, an installation method of the pit gate 3 according to the present embodiment will be described. First, it is determined whether the gap between the gate body 5 and the pool portion wall surface 1A is large or small (FIG. 13: Step S0). In a case where the gap is comparatively large, as shown in FIG. 12 (a), the gate body 5 is inserted in a state where the pressure in the hollow portion 29 is the atmospheric pressure (Step S1-1). Next, a gas is injected into the hollow portion 29 (Step S1-2). Thereby, as shown in FIG. 12(b), the seal portion main body 27 expands and comes into contact with the pool portion wall surface 1A, and a surface pressure therebetween is ensured. Thereafter, the water on the canal portion 2 side is discharged (Step S1-3).

Meanwhile, in a case where the gap between the gate body 5 and the pool portion wall surface 1A is comparatively small, the gate body 5 is installed (Step S2-2) in a state where the pressure in the hollow portion 29 is reduced (Step S2-1) and the seal portion main body 27 is contracted. Next, by returning the pressure in the hollow portion 29 to the atmospheric pressure (Step S2-3), the seal portion main body 27 expands and returns to an initial shape. Accordingly, the seal portion main body 27 comes into contact with the pool portion wall surface 1A, and the surface pressure therebetween is ensured. Thereafter, the water on the canal portion 2 side is discharged (Step S1-3).

According to the configuration, since a rigidity of the hollow portion 29 is low, even if there is some irregularities on the surface of the liner, the hollow portion 29 is crushed so that the gate body 5 can be easily inserted. In a case where the irregularities of the liner are large and the gate body 5 is not easily inserted even when the hollow portion 29 is crushed, the pressure in the hollow portion 29 is reduced by the gas supply unit 28 when the gate body 5 is inserted. Accordingly, a protrusion height of the seal portion main body 27 from the accommodation recess 9 can be suppressed to be low. Therefore, a friction force generated between the seal portion main body 27 and the pool portion wall surface 1A can be further reduced. Therefore, the gate body 5 can be inserted smoothly. However, when the pressure in the hollow portion 29 is the atmospheric pressure, in a case where the distal end portion of the seal portion main body 27 and the pool portion wall surface 1A do not abut against each other, the friction force generated between the distal end portion of the seal portion main body 27 and the pool portion wall surface 1A is small, and the gate body 5 can be inserted smoothly, the pressure in the hollow portion 29 may not be reduced. Meanwhile, in a state where the water on the canal portion 2 side is discharged and a high water pressure is applied from the pool portion 1 side, the hollow portion 29 is crushed by the water pressure. Therefore, the hollow portion 29 functions substantially as a solid seal. Accordingly, a shape/dimensions of the seal and a shape/dimensions of the hollow portion are set such that a sufficient surface pressure is provided and the seal portion main body 27 and the pool portion wall surface 1A (liner) abut each other.

Until the water on the canal portion 2 side is completely discharged, the water pressure applied from the pool portion 1 side is not yet sufficient. In a case where the water leaks from the pool portion 1 side to the canal portion 2 side, the pressure in the hollow portion 29 increases, and thus, the seal portion 62 is expanded. As a result, the seal portion main body 27 abuts against the pool portion wall surface 1A with a sufficient surface pressure. Therefore, the seal portion main body 27 can exert sufficient sealing performance even during drainage of the water on the canal portion 2 side. If the drain on the canal portion 2 side progresses, the hollow portion 29 is crushed by the water pressure from the pool portion 1 side, and a sufficient surface pressure is generated to ensure the sealing performance, the gas supply to the hollow portion 29 may be stopped.

In this way, according to the configuration, the gate body 5 can be easily inserted without being greatly affected by the irregularities of the pool portion wall surface 1A (liner). In addition, sufficient sealing performance can be secured even during the drainage of the canal portion 1. In addition, in a state where the water pressure is applied from the pool portion 2 side, the seal portion main body 27 can exert sufficient sealing performance without injecting the gas into the hollow portion 29.

The seventh embodiment of the present invention is described with reference to the drawings. Moreover, various changes and modifications can be made to the configuration within a scope which does not depart from the gist of the present invention.

Eighth Embodiment

Figure 14:
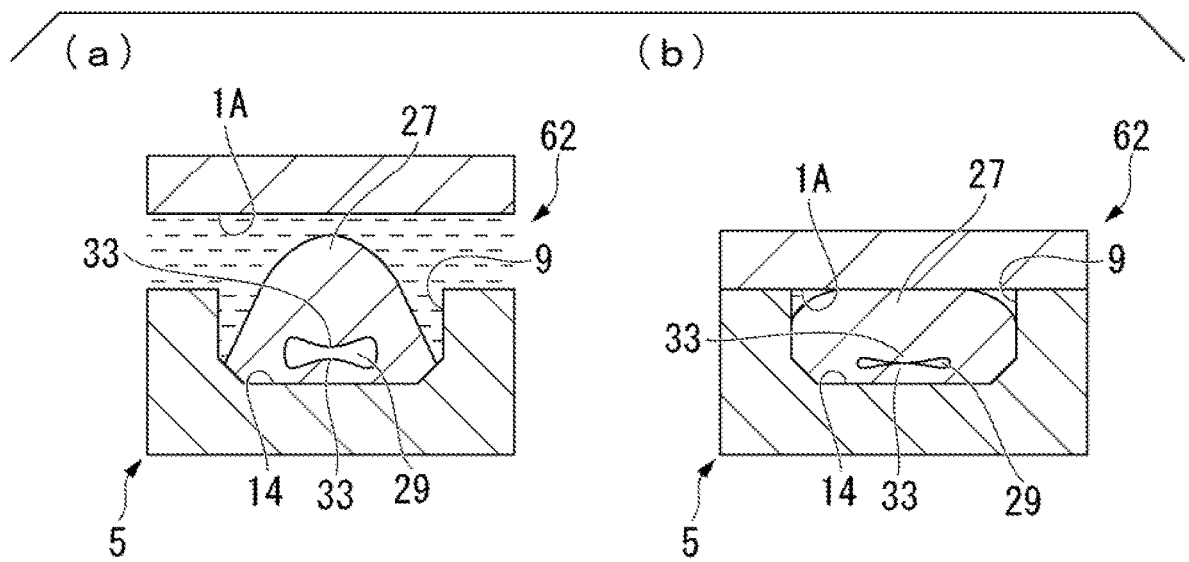
FIG. 14 is a diagram showing a configuration of a seal portion according to an eighth embodiment of the present invention, (a) shows a state before deformation and (b) shows a state after the deformation.

Next, an eighth embodiment of the present invention will be described with reference to FIGS. 14(a) and 14(b). Moreover, the same reference signs are assigned to the same configurations as those of the respective embodiments, and detail descriptions thereof are omitted. As shown in FIG. 14(a), in the present embodiment, a convex portion 33 is provided in the hollow portion 29 of the seal portion main body 27. The convex portion 33 is provided on an inner surface on at least one side in the direction connecting the pool portion 1 and the canal portion 2 in the hollow portion 29. An example of FIG. 14(a) shows a configuration in which convex portions 33 are respectively provided on the inner surfaces of both the pool portion 1 side and the canal portion 2 side. The convex portion 33 protrudes from the inner surface on one side toward the other side.

According to this configuration, the pair of convex portions 33 is provided in the hollow portion 29. Therefore, when the seal portion main body 27 is deformed so as to be crushed, the convex portion 33 abuts against another convex portion 33 facing the convex portion 33. As a result, an excessive deformation of the seal portion 62 (hollow portion 29) is limited (FIG. 14(b)). Therefore, a possibility that a local stress concentration is generated around the inner surface of the hollow portion 29 can be reduced, and occurrence of cracks or the like can be avoided.

The eighth embodiment of the present invention is described with reference to the drawings. Moreover, various changes and modifications can be made to the configuration within a scope which does not depart from the gist of the present invention.

Ninth Embodiment

Figure 15:
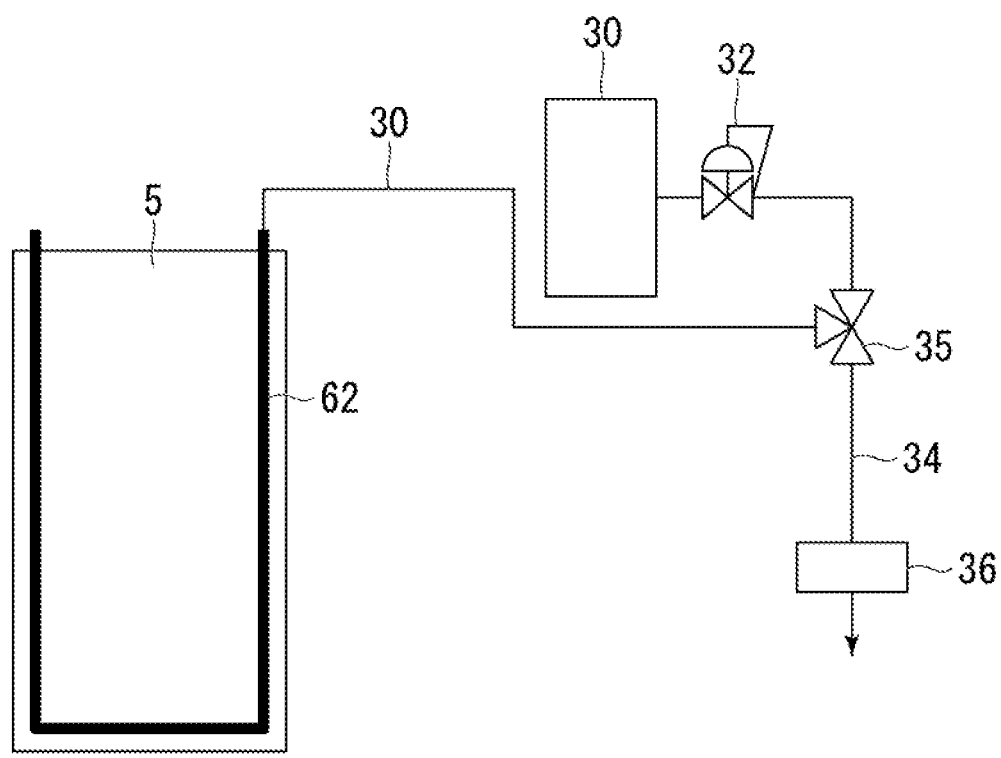
FIG. 15 is a diagram showing configurations of a pit gate and a seal portion according to a ninth embodiment of the present invention.

Subsequently, a ninth embodiment of the present invention will be described with reference to FIG. 15. Moreover, the same reference signs are assigned to the same configurations as those of the respective embodiments, and detail descriptions thereof are omitted. As shown in FIG. 15, in the present embodiment, the gas supply unit 28 further includes a branch channel 34, a three-way valve 35, and a safety valve 36. The branch channel 34 branches off from the main channel 31 which connects the seal portion main body 27 and the gas supply unit 28 to each other. The main channel 31 and the branch channel 34 are connected to each other by a three-way valve 35. The safety valve 36 is provided in the branch channel 34. The safety valve 36 is opened in a case where the pressure in the hollow portion 29 is equal to or more than a predetermined threshold value and releases the pressure to the outside.

According to the configuration, a possibility that the pressure in the hollow portion 29 excessively increases can be reduced. Therefore, damages of the seal portion main body 27 can be avoided, and the pressure in the seal portion 62 (in the hollow portion 29) can be appropriately maintained.

The ninth embodiment of the present invention is described with reference to the drawings. Moreover, various changes and modifications can be made to the configuration within a scope which does not depart from the gist of the present invention.

Tenth Embodiment

Figure 16:
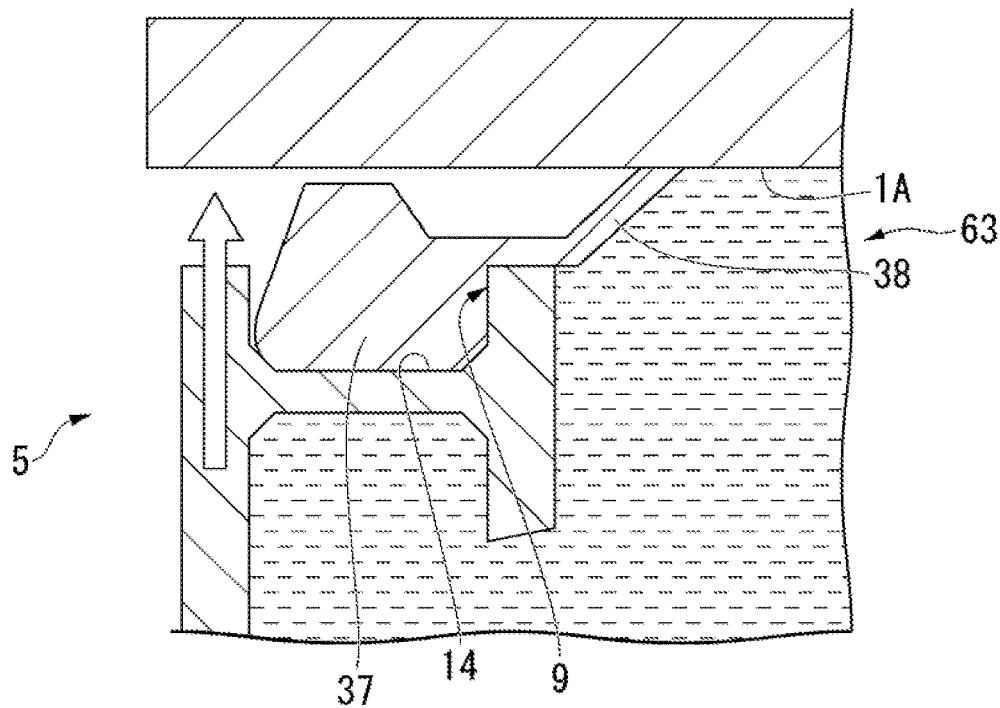
FIG. 16 is a cross-sectional view showing a configuration of a seal portion according to a tenth embodiment of the present invention.

Next, a tenth embodiment of the present invention will be described with reference to FIG. 16. Moreover, the same reference signs are assigned to the same configurations as those of the respective embodiments, and detail descriptions thereof are omitted. As shown in FIG. 16, in the present embodiment, a seal portion 63 has a seal portion main body 37 and a flap portion 38. The seal portion main body 37 is accommodated in an accommodation recess 9. The flap portion 38 has a plate shape which is provided so as to protrude from the seal portion main body 37 toward a side (one side in the width direction of the gate body 5) of the seal portion main body 37 in a horizontal cross section. Thereby, a distal end of the flap portion 38 (an end portion opposite to a connection end with the seal portion main body 37) is located on the side of the seal portion main body 37.

A distal end portion of the flap portion 38 protrudes toward the canal portion 2 side from the seal portion main body 37. More specifically, the flap portion 38 extends in a direction (one side in the width direction when viewed from the seal portion main body 37) close to the center portion of the gate body 5 from an end surface of the seal portion main body 37 on the side close to the central portion in the width direction of the gate body 5. The distal end portion of the flap portion 38 protrudes largely toward the canal portion 2 side of the seal portion main body 37 in a direction connecting the pool portion 1 and the canal portion 2. Further, a portion including the distal end portion of the flap portion 38 extends obliquely toward the central portion of the gate body 5 as the portion extends from the pool portion 1 side toward the canal portion 2 side. The seal portion main body 37 and the flap portion 38 are integrally formed of rubber (silicon rubber, EPDM, or the like).

According to the configuration, the distal end portion of the flap portion 38 protrudes more to the canal portion 2 side than the seal portion main body 37 in a direction connecting the pool portion 1 and the canal portion 2 to each other. Further, the distal end portion of the flap portion 38 and the seal portion main body 37 are separated from each other in the width direction of the gate body 5. Therefore, when the gate body 5 is inserted, only the flap portion 38 abuts against the pool portion wall surface 1A. Thereby, a friction force between the seal portion 63 and the pool portion wall surface 1A can be reduced. As a result, the gate body 5 can be smoothly inserted. Meanwhile, in a state where the water on the canal portion 2 side is discharged and a high water pressure is applied from the pool portion 1 side, the flap portion 38 and the seal portion main body 37 abut against the pool portion wall surface 1A, and thus, sufficient sealing performance can be obtained. Thus, according to the configuration, the gate body 5 can be easily inserted, and the seal portion 63 can exert sufficient sealing performance in a state where the water pressure is applied.

Figure 17:
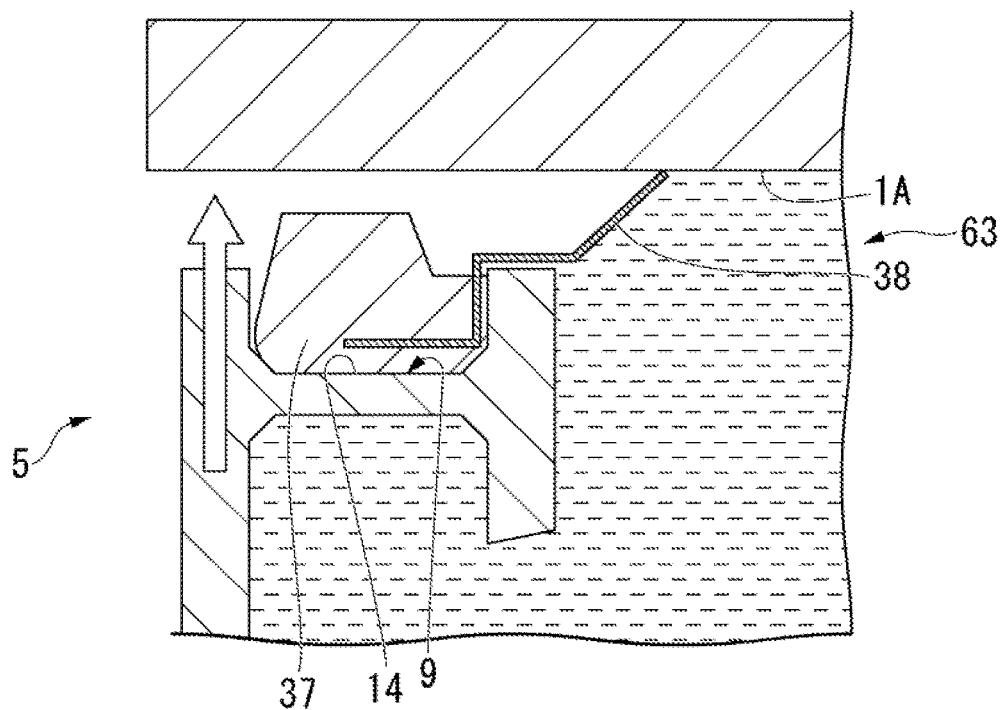
FIG. 17 is a cross-sectional view showing a modification example of the seal portion according to the tenth embodiment of the present invention.

The tenth embodiment of the present invention is described with reference to the drawings. Moreover, various changes and modifications can be made to the configuration within a scope which does not depart from the gist of the present invention. For example, as shown in FIG. 17, the seal portion main body 37 may be formed of rubber (silicon rubber, EPDM, etc.), and only the flap portion 38 may be formed of a metal. According to this configuration, the flap portion 38 is formed of a metal. Therefore, the flap portion 38 can have a certain degree of rigidity. Thereby, a possibility that the flap portion 38 is inadvertently deformed can be reduced. In a case where the flap portion 38 is inadvertently deformed, the flap portion 38 does not come into appropriate contact with the pool portion wall surface 1A. Accordingly, the minimum surface pressure required when the water on the canal portion 2 side is discharged cannot be ensured. However, according to the configuration, the possibility can be reduced.

Figure 18:
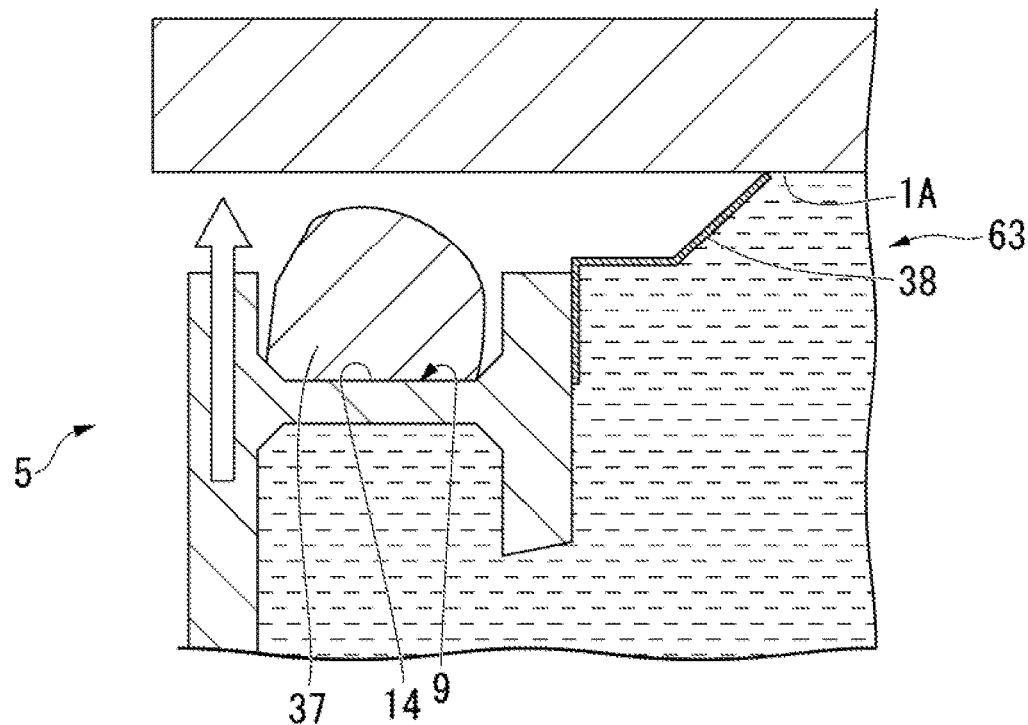
FIG. 18 is a cross-sectional view showing another modification example of the seal portion according to the tenth embodiment of the present invention.

Moreover, as shown in FIG. 18, the flap portion 38 may be provided separately from the seal portion main body 37 and attached to the gate body 5. According to this configuration, since the seal portion main body 37 and the flap portion 38 are provided separately from each other, the ease of manufacture of each member can be ensured.

Figure 19:
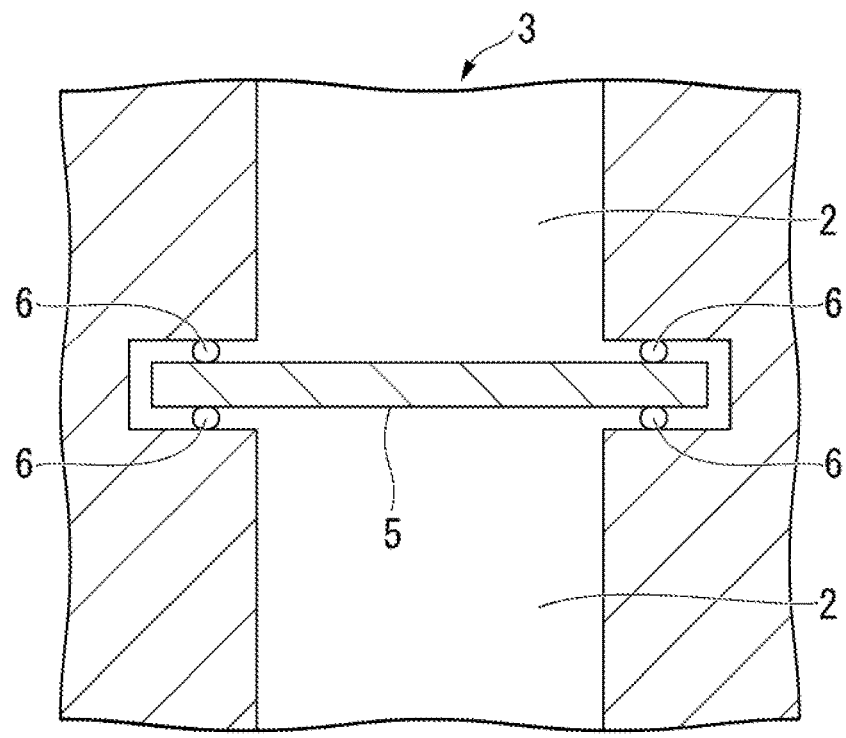
FIG. 19 is a plan view showing a modification example of the pit gate according to the embodiment of the present invention.

Hereinbefore, the embodiments of the present invention are described with reference to the drawings. Moreover, in the embodiments, the case where the pit gate 3 is provided at the connection portion connecting the pool portion 1 and the canal portion 2 to each other is described as an example. However, the position at which the pit gate 3 is provided is not limited to the above-described position. As shown in FIG. 19, a configuration which accommodates the gate body 5 in a slot 39 formed at an intermediate position of the canal portion 2 can be adopted. Moreover, the slot 39 is a groove which is formed on a side wall of the canal portion 2. In this case, the seal portion 6 may be provided on both surfaces of the gate body 5 or may be provided on only one surface.

INDUSTRIAL APPLICABILITY

According to the present invention, it is possible to provide a pit gate capable of being more smoothly inserted and having sufficient sealing performance, pit equipment, and a nuclear power facility.

REFERENCE SIGNS LIST

100: nuclear power facility
101: nuclear power facility main body
102: pit equipment
1: pool portion
2: canal portion
3: pit gate
4: opening portion
5: gate body
6: seal portion
7: engagement rod
8: hook
9: accommodation recess
10: low-rigidity portion
11: high-rigidity portion
12: plate-shaped portion
13: protruding portion
14: bottom surface
15: high-rigidity portion main body
16: edge portion
17: fixing lid
18: bolt
1A: pool portion wall surface
19: hollow portion
20: leaf spring
21: base portion
22: skirt portion
23: lip portion
24: water pressure chamber
25: base portion-side stopper portion
26: skirt portion-side stopper portion
27: seal portion main body
28: gas supply unit
29: hollow portion
30: bombe
31: main channel
32: valve
33: convex portion
34: branch channel
35: three-way valve
36: safety valve
37: seal portion main body
38: flap portion
39: slot
61, 62, 63: seal portion

What is claimed is:

1. A pit gate comprising:
a gate body which is configured to be inserted between a pool portion storing water and a canal portion connected to the pool portion in pit equipment having the pool portion and the canal portion, and is configured to change a flow state of the water; and
a seal portion which is accommodated in a groove-shaped accommodation recess formed in the gate body and seals a gap between the gate body on the pool portion side and a wall surface of the pit equipment on the canal portion side,
wherein the seal portion includes
a base portion which extends along a surface of the accommodation recess closer to the pool portion,
a skirt portion which is formed on the base portion so as to extend in a first direction approaching the canal portion,
a lip portion which is provided on a surface of the skirt portion on a side away from the center portion of the gate body and protrudes in a second direction opposite to the first direction in which the skirt portion is extended so as to form a water pressure chamber between the base portion and the lip portion, and
a base portion-side stopper portion which is provided on a side of the base portion approaching the center portion of the gate body from the skirt portion and protrudes toward the skirt portion, wherein the base portion-side stopper portion is located at a position in which the skirt portion is allowed to contact with the base portion-side stopper portion when the skirt portion is deformed toward the base portion.

2. A pit gate comprising:
a gate body which is configured to be inserted between a pool portion storing water and a canal portion connected to the pool portion in pit equipment having the pool portion and the canal portion, and is configured to change a flow state of the water; and
a seal portion which is accommodated in a groove-shaped accommodation recess formed in the gate body and seals a gap between the gate body on the pool portion side and a wall surface of the pit equipment on the canal portion side,
wherein the seal portion includes
a base portion which extends along a surface of the accommodation recess closer to the pool portion,
a skirt portion which is formed on the base portion so as to extend in a first direction approaching the canal portion,
a lip portion which is provided on a surface of the skirt portion on a side away from the center portion of the gate body and protrudes in a second direction opposite to the first direction in which the skirt portion is extended so as to form a water pressure chamber between the base portion and the lip portion, and
a skirt portion-side stopper portion which is provided in a portion of the skirt portion facing the base portion and protrudes toward the base portion, wherein the skirt portion-side stopper portion is allowed to contact the base portion when the skirt portion is deformed toward the base portion.

3. A pit equipment comprising:
the pit gate according to claim 1; and
the pool portion.

4. A nuclear power facility comprising the pit equipment according to claim 3.

5. The pit gate according to claim 1, wherein, when the skirt portion is deformed toward the base portion, the lip portion is moved in a direction toward a wall surface of the pool portion and is pressed against the wall surface of the pool portion while holding the water pressure chamber between the base portion and the lip portion.

* * * * *